United States Patent Office 2,914,521
Patented Nov. 24, 1959

2,914,521
SOLID, STABLE DIAZONIUM COMPOUNDS

Herbert Kracker and Hans Albert, Offenbach (Main), Germany, assignors to Farbwerke Hoechst Aktiengesellschaft vormals Meister Lucius & Brüning, Frankfurt am Main, Germany, a corporation of Germany No Drawing. Application May 7, 1957
Serial No. 657,486

Claims priority, application Germany May 9, 1956

6 Claims. (Cl. 260—141)

The present invention relates to new solid, stable diazonium compounds, more particularly it relates to diazonium compounds corresponding to the following general formula

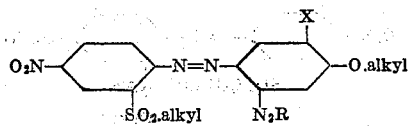

wherein X represents an alkyl or alkoxy group and $N_2R$ represents a diazonium chloride, diazonium sulfate, diazonium phosphate or diazonium chloride-zinc chloride radical.

We have found that solid, stable diazonium compounds are obtained by isolating in known manner in a solid form the diazonium compound from an orthoamino-azo compound of the following general formula

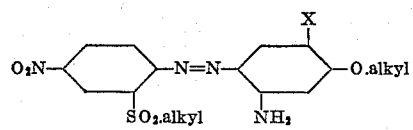

wherein X represents an alkyl or alkoxy group.

These hitherto unknown diazonium compounds are readily soluble in water and in many cases possess a very good stability. The new compounds can be isolated, for example, in the form of diazonium chlorides, diazonium sulfates, diazonium phosphates or diazonium chloride-zinc chloride double salts. The technical value and the stability and good solubility of the compounds do not depend upon the method of isolation, but are determined by the special constitution of the diazo compounds themselves, and especially by the effect of the alkylsulfone group.

The new diazo-azo compounds can be mixed with the usual standardizing agents and worked up to stable dyeing salts which can be used for the production of valuable water-insoluble azo-dyestuffs on the fiber.

The ortho-amino-azo compounds used as starting material for the process of the present invention, which have not been described in literature, can be obtained by known methods, for example by coupling diazotized 1-amino-4-nitrobenzene-2-alkylsulfones with 1-amino-4-alkyl-3-alkoxybenzenes or 1-amino-3,4-dialkoxybenzenes or their derivatives capable of being coupled, for example the arylsulfonylamino compounds or N-sulfonic acids, and subsequently splitting off the arylsulfonic acid or the sulfonic acid group.

The following examples serve to illustrate the invention but they are not intended to limit it thereto, the parts being by weight unless otherwise stated and the relationship of parts by weight to parts by volume being the same as that of the kilogram to the liter.

Example 1

36.4 parts of 2-amino-4-methoxy-5-methyl-2'-methylsulfonyl-4'-nitro-1,1'-azobenzene, obtainable by coupling diazotized 1-amino-4-nitrobenzene-2-methylsulfone with the sodium salt of 4-methyl-5-methoxybenzene-1-sulfamic acid and subsequently splitting off the sulfonic acid group, are diazotized at room temperature by introducing them into 142 parts of nitrosylsulfuric acid of 9.3% strength. After diluting the melt with 2550 parts by volume of water at 30° C. and adding 18 parts of kieselguhr, the solution is clarified by filtration. The diazonium sulfate of the amino-azo compound is separated from the filtrate by the addition of 320 parts of sodium sulfate. The crystalline precipitate is suction-filtered and dried at moderate temperature. The product so obtained is a yellow crystalline powder which is readily soluble in water and exhibits a very good stability at temperatures up to 40° C.

In the same manner the following amino-azo compounds can be converted with a good yield into their diazonium sulfates, which likewise possess a good stability:

2 - amino - 4 - ethoxy - 5 - methyl-2'-methylsulfonyl-4'-nitro-1,1'-azobenzene,
2-amino-4-methoxy - 5 - ethyl - 2'-methylsulfonyl-4'-nitro-1,1'-azobenzene.

Example 2

37.8 parts of 2-amino-4-methoxy-5-methyl-2'-ethylsulfonyl-4'-nitro-1,1'-azobenzene are dissolved at room temperature in 80 parts by volume of phosphoric acid of 90% strength and diazotized with 31.5 parts of nitrosylsulfuric acid of 41.9% strength. After dilution with 670 parts by volume of water and addition of 10 parts of kieselguhr, the solution is clarified by filtration. The diazonium phosphate of the amino-azo compound is separated from the filtrate by the addition of 110 parts of mono-sodium phosphate. The crystalline precipitate is suction-filtered and dried at moderate temperature. The product so obtained is a yellow crystalline product which is readily soluble in water and exhibits a very good stability at temperatures up to 40° C.

Example 3

38 parts of 2-amino-4,5-dimethoxy 2'-methylsulfonyl-4'-nitro-1,1'-azobenzene are stirred with 600 parts by volume of hydrochloric acid of 25% strength and diazotized in the usual manner at 50° C. with an aqueous solution of 10 parts of sodium nitrite. After 2 hours the mixture is diluted with 1500 parts by volume of water and after the addition of 15 parts of kieselguhr the red-brown diazo-solution is clarified by filtration. From the solution so obtained the diazonium chloride-zinc chloride double salt of the amino-azo compound is separated by the addition of 7 parts of zinc chloride dissolved in a small amount of water, and the separation is completed by the addition of 300 parts of sodium chloride. The yellow-brown precipitate is suction-filtered and dried at moderate temperature. The product so obtained is a powder which is readily soluble in water and exhibits a good stability at temperatures up to 40° C.

In the same manner the following amino-azo compounds can be converted with a good yield into their diazonium chloride-zinc chloride double salts, which likewise possess a good stability:

2 - amino - 4,5-diethoxy-2'-methylsulfonyl-4'-nitro-1,1'-azobenzene,
2 - amino - 4 - methoxy-5-methyl-2'-n-propylsulfonyl-4'-nitro-1,1'-azobenzene,
2 - amino - 4-methoxy-5-methyl-2'-n-butylsulfonyl-4'-nitro-1,1'-azobenzene.

We claim:
1. The diazonium compounds corresponding to the following general formula

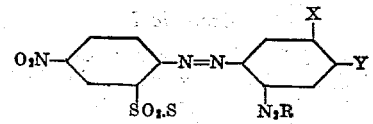

wherein X represents a member selected from the group consisting of methyl, ethyl, methoxy and ethoxy, Y represents a member selected from the group consisting of methoxy and ethoxy, Z means a lower alkyl group containing from 1 to 4 carbon atoms and $N_2R$ represents a radical selected from the group consisting of diazoniumchloride, diazoniumsulfate, diazoniumphosphate and diazoniumchloride-zinc chloride.

2. The diazonium compound corresponding to the following formula $$O_2N-\langle\rangle-N=N-\langle\rangle\begin{smallmatrix}CH_3\\-OCH_3\\N\equiv N\\SO_4H\end{smallmatrix}$$
$$SO_2.CH_3$$

3. The diazonium compound corresponding to the following formula $$O_2N-\langle\rangle-N=N-\langle\rangle\begin{smallmatrix}OC_2H_5\\-OC_2H_5\\N\equiv N\\Cl.ZnCl_2\\\overline{2}\end{smallmatrix}$$
$$SO_2.CH_3$$

4. The diazonium compound corresponding to the following formula $$O_2N-\langle\rangle-N=N-\langle\rangle\begin{smallmatrix}OCH_3\\-OCH_3\\N\equiv N\\Cl.ZnCl_2\\\overline{2}\end{smallmatrix}$$
$$SO_2.CH_3$$

5. The diazonium compound corresponding to the following formula $$O_2N-\langle\rangle-N=N-\langle\rangle\begin{smallmatrix}CH_3\\-OCH_3\\N\equiv N\\PO_4H_2\end{smallmatrix}$$
$$SO_2.C_2H_5$$

6. The diazonium compound corresponding to the following formula $$O_2N-\langle\rangle-N=N-\langle\rangle\begin{smallmatrix}CH_3\\-OCH_3\\N\equiv N\\Cl.ZnCl_2\\\overline{2}\end{smallmatrix}$$
$$SO_2.C_3H_7(n)$$

References Cited in the file of this patent
UNITED STATES PATENTS

| | | |
|---|---|---|
| 2,469,682 | Dickey | May 10, 1949 |
| 2,633,461 | Seidenfaden et al. | Mar. 31, 1953 |
| 2,744,103 | Koch | May 1, 1956 |

UNITED STATES PATENT OFFICE
CERTIFICATE OF CORRECTION

Patent No. 2,914,521                                                       November 24, 1959

Herbert Kracker et al.

It is hereby certified that error appears in the printed specification of the above numbered patent requiring correction and that the said Letters Patent should read as corrected below.

Column 3, lines 5 to 8, inclusive, the left-hand portion of the formula should read as shown below instead of as in the patent:

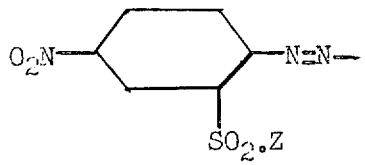

Signed and sealed this 24th day of May 1960.

(SEAL)
Attest:

KARL H. AXLINE                                               ROBERT C. WATSON
Attesting Officer                                                Commissioner of Patents